Feb. 16, 1943. H. T. KUCERA 2,311,236
HEAT CONTROL APPARATUS
Original Filed Dec. 28, 1935 3 Sheets-Sheet 1
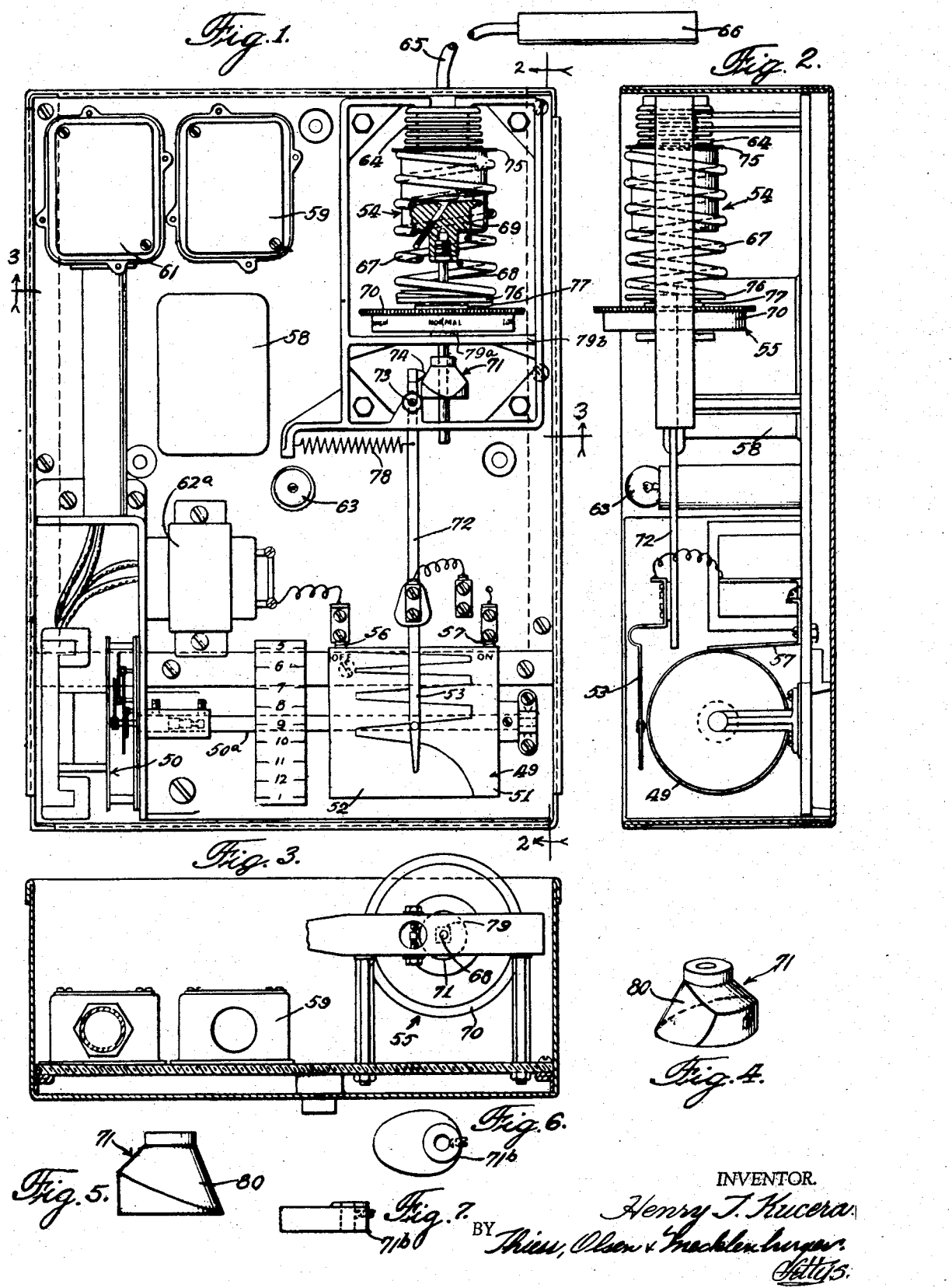
INVENTOR.
Henry T. Kucera
BY Thiess, Olsen & Mecklenburger
Attys.

Feb. 16, 1943.    H. T. KUCERA    2,311,236
HEAT CONTROL APPARATUS
Original Filed Dec. 28, 1935    3 Sheets-Sheet 2

INVENTOR.
Henry T. Kucera
BY Thiess, Olson & Mecklenburger
Attys.

Feb. 16, 1943. H. T. KUCERA 2,311,236
HEAT CONTROL APPARATUS
Original Filed Dec. 28, 1935  3 Sheets-Sheet 3

INVENTOR.
Henry T. Kucera.
BY Thiess, Olsen & Mecklenburger
Attys

Patented Feb. 16, 1943

2,311,236

UNITED STATES PATENT OFFICE 2,311,236

HEAT CONTROL APPARATUS

Henry T. Kucera, La Grange, Ill.

Original application December 28, 1935, Serial No. 57,449. Divided and this application November 7, 1941, Serial No. 418,130

7 Claims. (Cl. 236—46)

This application is a division of my co-pending application Serial No. 57,449, filed December 28, 1935, which has become Patent No. 2,271,651, dated February 3, 1942.

My present invention relates to the provision of heat control mechanism which is applicable to the control of the means for generating the heat, or to the control of the circulation of a heating medium.

One of the objects of my invention is to provide an improved temperature control device which will secure periodic functioning of the heating apparatus, the number of periods and the length thereof being regulated by an element responsive to temperature changes, and to combine with such a control manual adjustment which will adapt the temperature responsive control to the presence or absence of sun or wind, or other general conditions affecting the heat requirements of the premises.

A further object of my invention is to provide improved apparatus for controlling the supply of heat to a plurality of different regions, each to be heated in accordance with variations in outside temperature and in accordance with the thermal requirements and characteristics.

Further objects and advantages of the invention will be apparent from the description and claims.

In the drawings,

Figure 1 is a front elevational view showing a form of control apparatus embodying my invention;

Fig. 2 is a section on the line 2—2 of Fig. 1;

Fig. 3 is a section on the line 3—3 of Fig. 1;

Fig. 4 is a perspective view of the control cam of Fig. 1;

Fig. 5 is a side view of the cam;

Fig. 6 is a plan view of another form of cam which may be used;

Fig. 7 is a side view of the cam shown in Fig. 6;

Figure 10:
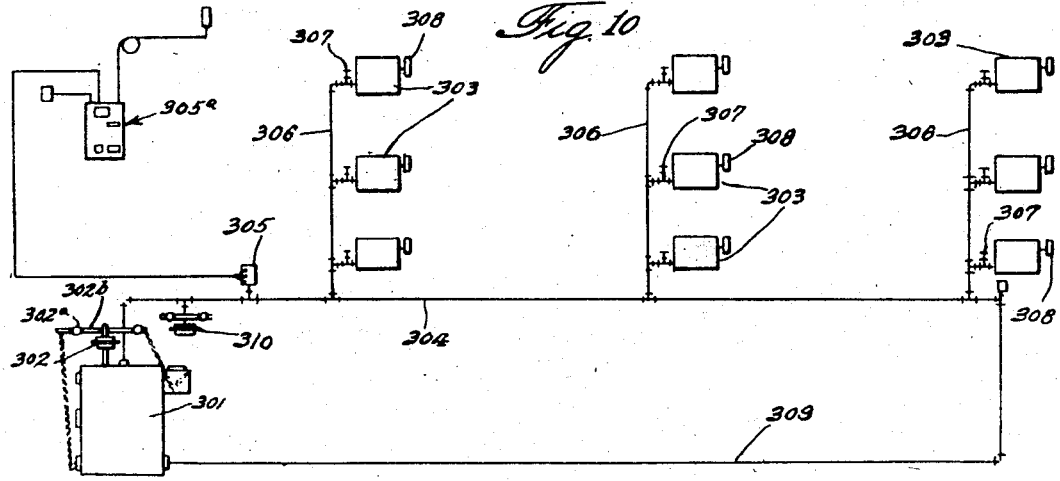
Fig. 10 is a diagrammatic view showing a heating system embodying my invention.

The apparatus of Figs. 1 to 8, incl., will now be described. It comprises a rotatable time-controlled, circuit-controlling drum 49, driven by a clock mechanism 50 which may be actuated by a synchronous motor or may be spring wound, the drum being provided with two conducting areas 51 and 52, insulated from each other, a shiftable contact device 53 brought into engagement alternately with one or the other of the two conducting areas 51 or 52 on the drum as the drum revolves, means 54 controlled by outside temperature for controlling the position of the shiftable contact device 53 with respect to the drum, additional manually controlled means 55 for controlling the position of the movable contact device 53 with respect to the drum, a stationary contact device 56 engaging the left-hand conducting area 52 of the drum, as viewed in Fig. 1, a stationary contact device 57 engaging the right-hand contact area of the drum, a relay 58 controlled by the circuits established by the three contact devices 53, 56 and 57, a terminal box 59 for a three-wire motor circuit leading to any suitable heat supply control device 60 (Fig. 8), such as a pneumatically operated steam valve, a control for a gas or oil burner or stoker, a manually operable three-way switch 61, which in one position places the heat supply control 60 under the control of the control drum 49, in another position disconnects the heat supply control from the drum control and places it in "on" condition, and in a third position disconnects the heat supply control means from the control of the control drum and places it in "off" condition, a manually operable switch 62 for starting and stopping the electric clock mechanism, a transformer 62a for providing current of the desired characteristics, and a pilot light 63 which, when illuminated, indicates that the heat supply is on and, when not illuminated, indicates that the heat supply if off.

The outside thermostatic control apparatus for controlling the position of the contact with respect to the drum comprises an expansible and contractible chamber 64 which may be of the Sylphon type containing a liquid or gas affected by changes in outside temperature by means of a conduit 65 connecting it with a bulb 66 located at a point where it is subject to outdoor temperature, a coil compression spring 67 opposing the expansive action of the fluid in the chamber, a plunger rod 68 having a swivel connection with the reciprocable head 69 of this expansible chamber, a manually operable hand wheel 70 for effecting the swivelling or rotating movement of this plunger 68, a cam 71 (Fig. 4) having a conoidal surface and fixedly secured with respect to said plunger 68, and a lever 72 pivotally mounted at 73 carrying on its lower end the spring contact device 53 and having on its upper end a follower 74 engaging the conoidal surface of the cam 71. The expanding action of the fluid in the chamber 64 takes place against the tension of the coil compression spring 67 which engages a shoulder 75 on the head of the expansible chamber, the lower end of this spring being seated on a plate 76 resting on an anti-friction bearing 77, which, in turn, is backed up by the surface of the adjustable hand wheel 70, enabling the hand wheel to be adjusted without exerting undue torsion on the expansible chamber and without causing excessive friction opposing movement of the hand wheel. A suitable spring 78 is provided for holding the follower 74 in engagement with the cam surface. The reciprocable plunger 68 may be slidably but non-rotatably associated with respect to the hand wheel 70 by providing the plunger with a squared portion 79 (Fig. 3) slidably engaging a squared aperture in the hand wheel 70 so that the hand wheel does not interfere with the up-and-down movement of the plunger rod 68, but so that the hand wheel can be used to effect a rotary movement of the plunger rod and of the cam 71 carried by the lower end of the plunger. The hand wheel 70 may be held against downward movement in any suitable manner as by engagement of its hub 79a with the cross support 79b.

Figure 8:
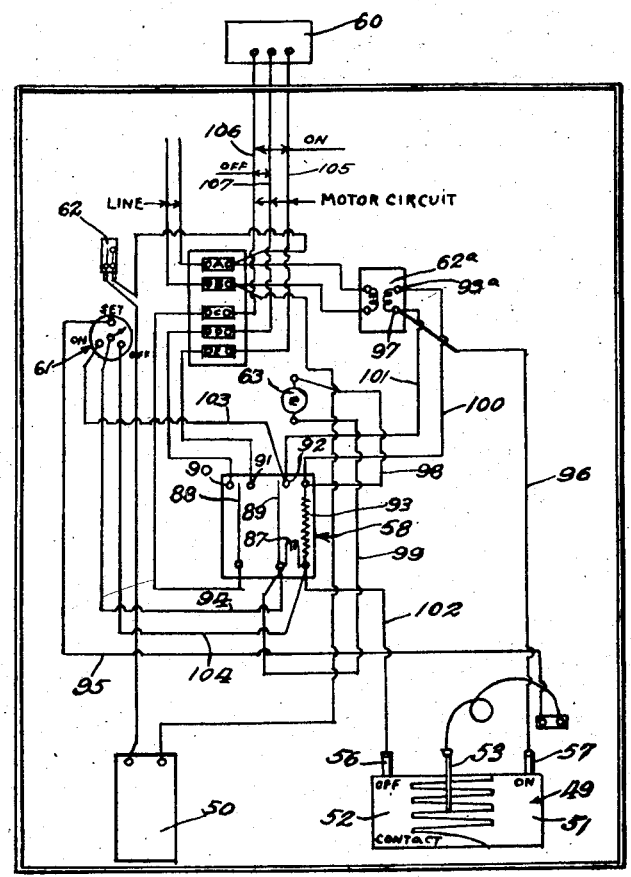
Fig. 8 is a wiring diagram for the circuit of Fig. 1.

The action of the relay 58 with respect to the motor circuit is such that when the shiftable contact 53 is in engagement with the right-hand conducting area 51 of the drum, as viewed in Figs. 1 and 8, the heat supply will be on and such that when the shiftable contact 53 is in engagement with the lefthand conducting area 52 of the drum, as viewed in Figs. 1 and 8, the heat supply control will be off. With this construction, it will be seen that in general movement of the shiftable contact device 53 to the right, as viewed in Fig. 1, will increase the length of the "on" periods of the heat supply control means and will decrease the length of the "off" periods and, vice versa, movement to the left of the contact device will decrease the length of the "on" periods and increase the length of the "off" periods. This, of course, is due to the outline or shape of the two conducting areas which are insulated from each other. The design of the apparatus is such that as shown in Fig. 1, a low temperature will cause a contraction of the expansible chamber 64, causing a rise in the conoidal cam member 71, tending to shift the follower member 74 to the left and the contact member 53 to the right to increase the length of the "on" periods and decrease the length of the "off" periods, thus increasing the heat supply to take care of the low temperature. Conversely, a high temperature will expand the chamber 64, pushing the cam member down and allowing the spring 78 to pull the contact member 53 to the left to shorten the length of the "on" periods and increase the length of the "off" periods to take care of the higher outside temperature. However, as previously pointed out, the control by outside temperature is not sufficient to take care of other variations and conditions such as cloudiness, high wind, humidity, variation in building occupancy, etc., and a further manual control may be exercised by means of the adjustable hand wheel 70 which can be operated to swivel the plunger rod 68 and bring a different element of the conoidal surface into cooperative relation with respect to the follower. Various designs for the surface of this cam may be employed. That shown in Figs. 1, 4, and 5 comprises a generally conoidal surface 80, the intersections of which with different planes through the axis of the cam have different degrees of angularity with respect to the axis of the cam. Thus, in Fig. 5, the left-hand side of the conoidal surface shown has an angle of approximately 45 degrees with respect to the axis of the cam, whereas the right-hand side of the conoidal surface has an angle with respect to the axis of the cam of approximately 20 degrees. The angularity of the intersection of the axial planes may be made to vary gradually from the greater to the lesser angle. Because of this construction, the radial distance of the follower 74 from the axis of the cam will be changed as the plunger rod 68 is turned by means of the hand wheel, thus changing the position of the contact with respect to the drum. It will be seen that a change of radial distance will take place regardless of the vertical position of the cam determined by the thermostatic control but that the amount of change of said radial displacement for a given turning movement of the cam will increase as the outside temperature decreases. It may also be seen that the rate of change of the radial distance for a given vertical movement will vary with the angular position of the cam.

By means of this manual control of the cam, an attendant can superimpose a manual control on the thermostatic control to take care of unusual conditions, such as high winds, cloudiness, excessive humidity, increase in heating load, etc., which would cause a requirement for more heat than would be furnished under the normal operation of the thermostatic control. If a condition exists calling for such additional heat supply, the attendant, by means of the hand wheel 70, will rotate the plunger 68 and the cam 71 carried thereby to shift the cam to a position in which the radial distance of the follower 74 from the axis of the cam will be increased, thus shifting the contact device to the right, as viewed in Fig. 1, to increase the length of the "heat on" periods and decrease the length of the "heat off" periods. On the other hand, if conditions are such that less than the normal supply of heat is necessary,—such as might be occasioned by a very sunshiny quiet day, or over a week-end when a lower maintained temperature is desired, the attendant, by means of the hand wheel 70, may rotate the cam to a position which will decrease the radial distance of the follower from the axis of the cam, resulting in a shift of the contact 53 to the left, as viewed in Fig. 1, with a consequent decrease in the heat supply. At the new angular positions of the cam, should there be a variation of temperature outdoors, the radial distance will be varied accordingly with the rate of variance greater than normal in the first case and less than normal in the second case.

The heat supply control means are thus subject to three controls,—(1) the time control effected by the time-controlled movement of the rotatable drum 49 (this enables various desirable results to be accomplished, such as a daily program, including a "morning heating-up" period, a "day-time controlled" period, and a "night-off" period); (2) the outside temperature control, effected by means of the expansible chamber 64 and associated parts (this automatically increases or decreases the heat supply in accordance with a fall or rise of outside temperature); and (3) the manual control, by means of which the attendant can superimpose a control on the thermostatic control to take care of unusual conditions, such as cloudiness, high wind, excessive humidity, etc.

For ease of operation, the manually operable hand wheel 70 may be made to project through an opening in the front of the casing. Suitable indicating means may be provided on or adjacent the hand wheel to indicate the direction in which the hand wheel should be turned and the extent of the movement necessary to effect the desired increase or decrease in the heat supply.

Figure 9:
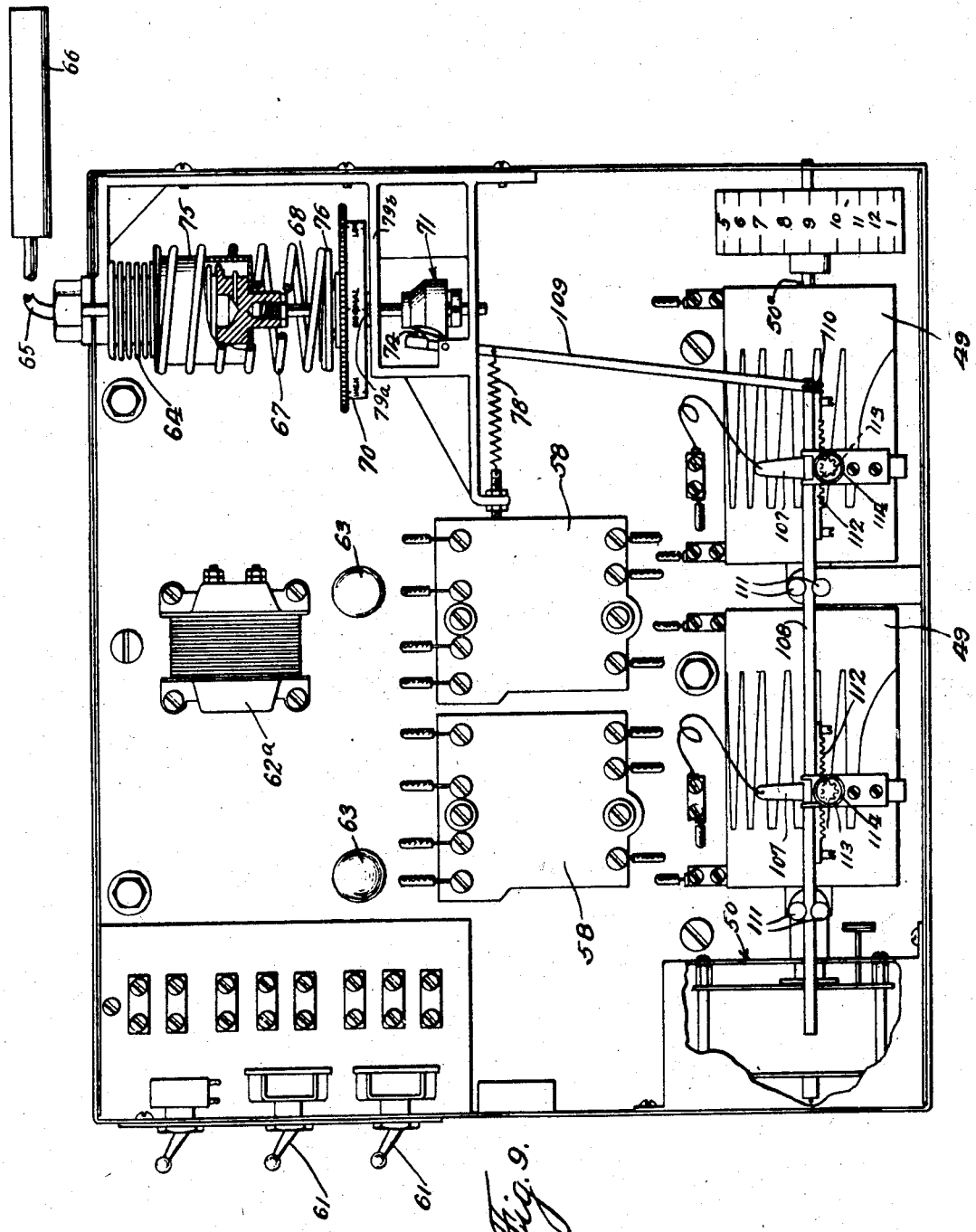
Fig. 9 is a front elevational view showing a double-drum control apparatus for controlling the heat supply for two different regions to be heated.

In Fig. 9 is shown apparatus subject to the three controls—time control, outside temperature control and attendant control, for controlling the heat supply for a plurality of different regions to be heated, such as different parts or zones of a building which may have different thermal characteristics or may be subject to different uses, or such as a number of different buildings. The apparatus employs a common outside temperature control, a common transformer and a common time control for the different regions. In this apparatus a plurality of drums 49 are employed—one for each different region—also a plurality of relays 58 controlled by the drums and a plurality of three-way switches 61—one for each of the drums. The outside temperature control apparatus is in general the same as that disclosed in connection with Fig. 1 and will not be described in further detail. The relay apparatus 58, transformer 62a, time-controlled clock mechanism 50 and three-way switches 61 are also substantially as disclosed in connection with Fig. 1. The drums 49 may be placed in axial alignment and may all be driven from the same clock mechanism 50. The angular position of the several drums 49 relative to the drum shaft 50a may be such that the heating periods of no two zones start or end at the same time. This staggering of the operation helps to balance the load on the heat generating plant.

In one form the movable contacts 107 for both of the drums shown in Fig. 9 are mounted on a common reciprocable bar 108, the position of which is controlled by the cam-controlled lever 109, which has a pin and slot connection with the sliding bar 108, as shown at 110. This reciprocable bar 108 may be mounted for ease of movement between pairs of opposed anti-friction rollers 111. The shiftable contacts 107 are mounted for independent adjustment longitudinally of the reciprocable bar. This adjustment is effected by means of a rack 112 secured to the reciprocable bar and a pinion 113 meshing with this rack and rotatably mounted on the carriage of the shiftable contact. A thumb button 114 may be provided for turning the pinion 113 to effect longitudinal adjustment of the contact 107 with respect to the reciprocable bar.

In Fig. 10 is shown a steam heating system controlled by one of the forms of apparatus previously described, which apparatus embodies the three controls—time, outside temperature and manual control. This shows a one-pipe system of steam heating in which a boiler 301 is provided having means 302 for controlling the steam pressure, the extent of the pressure being regulable by adjusting the weights 302a on the lever arm 302b. Steam is distributed to the radiators 303 through the main conduit 304. In this main conduit 304 is located an automatically operated shut-off valve 305 controlled by the triple control regulator 305a, which may be in general similar to the control apparatus previously described, that shown diagrammatically corresponding to the construction shown in Fig. 1. The branch risers 306 lead from the main conduit 304 to the radiators through shut-off valves 307. Each of the radiators may be provided with an air valve 308 to permit the escape of entrained air while maintaining the steam within the radiators. If desired, air valves may also be installed on the branch risers and on the main conduits. The condensation from the radiators may be returned to the boiler through conduit 309.

Further modifications will be apparent to those skilled in the art and it is desired, therefore, that the invention be limited only by the prior art and the scope of the appended claims.

Having thus described my invention, what I claim and desire to secure by Letters Patent is:

1. In a heating system for heating a plurality of zones, each having radiating units, electrically controlled means individual to each of said zones for alternately admitting and checking the flow of heating medium to the radiating units thereof, in cycles of a fixed predetermined frequency, with the periods of checking for one zone out of phase with respect to such periods for another zone or zones, thermostatic means subject to the prevailing temperature variations external to the zones to be heated by the system, and means controlled by said thermostatic means for automatically varying the proportion of elapsed time occupied by said periods of checking, to an extent, for all said zones, depending on said prevailing temperature variations, while maintaining said predetermined frequency, and said out of phase relationship.

2. In a heating system for heating a plurality of zones, each having radiating units, electrically controlled means individual to each of said zones for alternately admitting and checking the flow of heating medium to the radiating units thereof, in cycles of a fixed predetermined frequency, with the periods of checking for one zone out of phase with respect to such periods for another zone or zones, a thermostat subject to the prevailing temperature variations external to the zones to be heated by the system, means controlled by said thermostat for automatically varying the proportion of elapsed time occupied by said periods of checking, to an extent, for all said zones, depending on said prevailing temperature variations, while maintaining said predetermined frequency, and said out of phase relationship; and manually adjustable means individual to each zone for also varying the proportion of elapsed time occupied by said periods of checking for each zone, during the continuance of the automatic variations.

3. Apparatus for distributing steam to a steam heating system having a plurality of groups of radiators for serving respectively various zones of the structures to be heated, a source of steam, conduits running respectively from said source to each of said groups, an electrically controlled valve in each of said conduits, time controlled means for intermittently operating said valves to check the flow of steam from said source to the conduits for each of said groups respectively at substantially interspaced intervals, said time controlled means including a continuously rotatable circuit controlling device, the effective contour of said device varying at different portions thereof, contact means individual to each of said valves respectively, the contact means corresponding to each valve respectively being arranged to be energized by reason of the action of said device when the latter is in different angular positions, to cause the interspacing of said intervals, thermostatic means subject to temperature variations outside the spaces heated by the system, and means controlled by said thermostatic means upon variation of the outside temperature for selecting sections of said device which are to be effective to control said contact means.

4. In a heat transfer system for transferring heat with respect to a plurality of zones, each having heat transfer units, means individual to each of said zones for alternately admitting and checking the flow of heat transfer medium to the heat transfer units thereof, in cycles of a fixed predetermined frequency, with the periods of checking for one zone out of phase with respect to such periods for another zone or zones, thermostatic means subject to the prevailing temperature variations external to said zones, and means controlled by said thermostatic means for automatically varying the proportion of elapsed time occupied by said periods of checking, to an extent, for all said zones, depending on said prevailing temperature variations, while maintaining said predetermined frequency, and said out of phase relationship.

5. In a heat transfer system for transferring heat with respect to a plurality of zones, each having heat transfer units, means individual to each of said zones for alternately admitting and checking the flow of heat transfer medium to the heat transfer units thereof, in cycles of a fixed predetermined frequency, with the periods of checking for one zone out of phase with respect to such periods for another zone or zones, a thermostat subject to the prevailing temperature variations external to said zones, means controlled by said thermostat for automatically varying the proportion of elapsed time occupied by said periods of checking, to an extent, for all said zones, depending on said prevailing temperature variations, while maintaining said predetermined frequency, and said out of phase relationship, and the proportion of elapsed time occupied by said periods of checking for each zone, during the continuance of the automatic variations.

6. In a heat transfer system for transferring heat with respect to a plurality of zones, each having heat transfer units, means individual to each of said zones for alternately admitting and checking the flow of heat transfer medium to the heat transfer units thereof, in cycles of a fixed predetermined frequency, with the periods of checking for one zone out of phase with respect to such periods for another zone or zones, thermostatic means subject to the prevailing temperature variations external to said zones, and means controlled by said thermostatic means for automatically varying the proportion of elapsed time occupied by said periods of checking, to an extent, for all said zones, depending on said prevailing temperature variations, while maintaining said predetermined frequency, and said out of phase relationship, said time controlled means including a continuously rotatable circuit controlling device, the effective contour of said device varying at different portions thereof, a plurality of circuit contacts for controlling said valves respectively, each of said contacts being arranged to be energized respectively by reason of the action of said device when the latter is in different angular positions, to cause the interspacing of said intervals, and means for adjusting the position of said contacts individually in respect to said device to alter the effective contour of the device acting to control each contact and to thereby vary the intervals of energization of said contacts.

7. In a heat transfer system for transferring heat with respect to a plurality of zones, each having heat transfer units, means individual to each of said zones for alternately admitting and checking the flow of heat transfer medium to the heat transfer units thereof, in cycles of a fixed predetermined frequency, with the periods of checking for one zone out of phase with respect to such periods for another zone or zones, thermostatic means subject to the prevailing temperature variations external to said zones, and means controlled by said thermostatic means for automatically varying the proportion of elapsed time occupied by said periods of checking, to an extent, for all said zones, depending on said prevailing temperature variations, while maintaining said predetermined frequency, and said out of phase relationship, said time controlled means including a continuously rotatable circuit controlling device, the effective contour of said device varying at different portions thereof, contact means individual to each of said valves respectively, the contact means corresponding to each valve respectively being arranged to be energized by reason of the action of said device when the latter is in different angular positions, to cause the interspacing of said intervals, said thermostatic means including members subject to temperature variations outside the spaces heated by the system, and means controlled by said thermostatic means upon variation of the outside temperature for selecting sections of said device which are to be effective to control said contact means.

HENRY T. KUCERA.